Jan. 3, 1950     J. D. HAGY     2,493,454
GAS PROCESSING FOR THE SYNTHESIS OF HYDROCARBONS
Filed Dec. 15, 1944     3 Sheets-Sheet 1

Inventor:
James D. Hagy
By: Everett A. Johnson
Atty.

Jan. 3, 1950 J. D. HAGY 2,493,454
GAS PROCESSING FOR THE SYNTHESIS OF HYDROCARBONS
Filed Dec. 15, 1944 3 Sheets-Sheet 3

Inventor:
James D. Hagy
By: Everett A. Johnson
Atty

Patented Jan. 3, 1950

2,493,454

UNITED STATES PATENT OFFICE 2,493,454

GAS PROCESSING FOR THE SYNTHESIS OF HYDROCARBONS

James D. Hagy, Tulsa, Okla., assignor to Stanolind Oil and Gas Company, Tulsa, Okla., a corporation of Delaware Application December 15, 1944, Serial No. 568,315

2 Claims. (Cl. 260—449.6)

This invention relates to hydrocarbon synthesis and it pertains more particularly to an improved method and means for effecting the synthesis of hydrocarbons on a commercial scale.

A major problem in the synthesis of hydrocarbons by the catalytic reduction of carbon monoxide is that of heat removal and temperature control. The synthesis is exothermic and the synthol process as heretofore known to the art has been extremely cumbersome and expensive so that it has not been considered economical for use in the United States. Therefore an object of this invention is to provide a simplified and improved hydrocarbon synthesis system which is commercially feasible in this country.

In a reactor for synthesizing 4000 to 5000 barrels per day of liquid product, the heat of reaction which is liberated may amount to about 300 to 400 million B.t.u. per hour. It is not only necessary to remove this vast amount of heat, but it is also necessary that the conversion temperature in the synthesis zone be maintained within relatively narrow limits, any undue temperature rise or hot spots tending to cause the reaction to run away and produce primarily methane instead of the desired liquid hydrocarbons and to ruin the activity of the catalyst. Therefore a further object of this invention is to provide a system wherein the synthesis temperature may be controlled and maintained within the desired limits.

In previous systems, fixed bed catalyst reactors have been used with cooling surfaces provided for contacting substantially each increment of the fixed catalyst bed. A 5000 barrel per day system would thus require a reactor system containing approximately 1,400,000 square feet of cooling surface. Not only is the investment and operating cost of such a system extremely high, but the problem of temperature control is still substantially unsolved because the catalyst particles are extremely poor conductors of heat with the result that catalyst which is even a few millimeters from the cooling surfaces is at a temperature much higher than desired. An object of this invention is to provide a method and means whereby the heat of synthesis reaction can be removed and the reaction temperature may be controlled within a relatively narrow range without encountering the inevitable difficulties which are inherent in fixed bed operations.

Another object of the invention is to provide an improved system for converting hydrocarbon gases such as natural gas into normally-liquid or normally-solid hydrocarbons and to utilize, in this system, the methane and ethane produced in the system itself. A further important object of this invention is to improve the efficiency and to decrease the expense of a system for obtaining a desired hydrogen-carbon monoxide mixture from normally-gaseous hydrocarbons and air.

A further object of the invention is to minimize the amount of cooled surfaces and cooling liquid required to recover the product. Another object is to provide an improved product recovery system for separating liquid hydrocarbons from other components of an effluent product stream.

Still another object is to provide a system for producing increased amounts of hydrocarbons boiling within the gasoline range by subjecting a selected fraction of the synthesis product to a catalytic conversion.

Another object of this invention is to provide method and means for utilizing the energy of gasiform fluids within the system for operating turbine-driven compressors.

A further object of this invention is to provide improved method and means for employing the so-called "fluid type" catalyst technique in effecting hydrocarbon synthesis from carbon monoxide and hydrogen. Other objects will become apparent as the detailed description of this invention proceeds.

In general the objects of this invention are attained by raising compressed air, natural gas, and a small amount of recycled gas to reaction temperature by combustion of a portion of the gas with all the air within a combustion case. The remainder of the gas is then bled into the hot gases from the combustion case at the entrance to the reformers. The reaction within the reforming case is very nearly adiabatic, i. e., the oxidation of methane with the remaining oxygen will furnish sufficient heat for the reaction of methane with part of the carbon dioxide and water formed in the combustion cases. The synthol feed gas so produced is supplied to a reactor employing fluidized catalyst. Bayonet-type tube assembly in the reactor removes the heat directly from the fluidized dense turbulent catalyst phase. Saturated steam at 200 pounds per square inch gauge is generated within the tube assembly, and control of the rate of heat removal may be accomplished either by variation of the steam pressure or by control of the number of tubes in operation. The reaction product is cooled by direct contact with cooling water. Product recovery is effected from the uncondensed gases by adsorption on activated carbon.

The preferred raw material for the production of carbon monoxide and hydrogen is natural gas, but carbon monoxide-hydrogen mixtures may be used when obtained from other sources such as from coal, shale, or like carbonaceous materials. Some natural gases such as those obtained from the Hugoton field are of low sulfur content and need not be desulfurized. When necessary, however, the natural gas is first freed of hydrogen sulfide and organic sulfur compounds by conventional desulfurization processes.

A considerable amount of heat must be supplied for the gas reforming operation and this heat is preferably produced by burning a part of the gas in a separate combustion case. The balance of the methane or natural gas is commingled with the hot combustion products and the admixture is passed through a catalyst bed. The catalyst is preferably a Group VIII metal or metal oxide which is either unsupported or supported on clay, kieselguhr, silica gel, alumina, an acid treated clay such as Super Filtrol, and the like. The catalyst may be promoted by aluminum, magnesium, calcium, uranium, chromium, molybdenum, vanadium, and the like metal or metal compound, for example, the metal oxide. A sufficiently-high temperature, for example, above about 2500° F. is maintained within the combustion cases so that a temperature of about 1750° F. is obtained by mixing combustion gases and feed gases entering the reforming reactor.

The space velocity through the gas reforming catalyst should be sufficient to give a contact time of between about 2 and about 60, preferably about 10 to 30 seconds. The temperature of this operation is preferably at between about 1500 and about 1850° F. for example 1750° F. The pressure may be from atmospheric to about 250 pounds per square inch. This reforming operation converts the methane-carbon dioxide-steam mixture resulting from the blending of methane with the combustion products of the combustion cases into a gas consisting chiefly of hydrogen and carbon monoxide and diluent nitrogen. This gas mixture is hereinafter referred to as "synthesis feed gas."

The synthesis feed gas is cooled and introduced into a synthesis reactors at about 610° F. and at about 175 pounds per square inch gauge when employing iron catalyst. Lower temperature and pressure may be used for optimum results with cobalt-type catalyst. The catalyst, however, whether it be the cobalt type or iron type, should be of relatively small-particle size so that it may be fluidized by an up-flowing gas or vapor stream. The maintenance of the suspended dense turbulent catalyst phase in the synthesis reactor insures uniform temperature throughout the reactor. In order to prevent the temperature level of the reactor from gradually increasing, or in other words, to remove the heat of reaction, the plurality of individually-controlled bayonet-type cooling tubes which extend through substantially the entire depth of dense catalyst are employed.

In systems of this type, catalyst solids of small-particle size are fluidized by upflowing gases or vapors within the reactor so that the catalyst within the reactor is maintained in a turbulent liquid-like dense phase, the extreme turbulence of the suspended catalyst particles resulting in the maintenance of uniform temperatures throughout the entire mass of catalyst within the reactor. The catalyst particles of the order of 2 to 200 microns or larger, preferably 20 to 100 microns in particle size, and with vertical gas velocity of the order of about .4 to 4.0, preferably between about 1 and about 3, for example, about 1.5 feet per second, a liquid-like dense phase of catalyst is obtained in which the density is between about 30 and about 90% preferably between about 40 and about 80, e. g., about 60% of the density of the settled catalyst material. The vertical velocity of the reaction gases is, in any event, regulated so as to produce a turbulent suspension of catalyst within the reactor.

The catalyst for the synthesis reaction may be either of the cobalt type or of the iron type. The cobalt type promotes the reaction:

$$2xH_2 + xCO \rightarrow (CH_2)_x + xH_2O$$

and the iron-type catalyst promotes the reaction:

$$3xH_2 + 3xCO \rightarrow 2(CH_2)_x + xH_2O + xCO_2$$

In either case, the cataylst should be in finely divided form so that it can be fluidized by gases flowing upwardly through the body of catalyst at low velocity. The use of catalyst particles of such structure, shape, and size as to be fluidized by up-flowing gases of the above velocities is an important feature of the invention.

An iron-type catalyst may be prepared by igniting iron nitrate with optionally-added promoters and carrier. An iron nitrate solution which may contain up to 25% copper (based on the iron) may be precipitated onto Super Filtrol, kieselguhr or other carrier by alkali carbonates, then dried and impregnated with .5 to 3% of potassium carbonate. After ignition, the catalyst thus prepared may be introduced directly into the reactor and reduced to metallic iron under synthesis conditions. Alternatively, iron cataylst of the type used for ammonia synthesis may be employed. Pure iron may be burned in a stream of oxygen, the oxide (Fe₃O₄) fused, and the melt broken up and used as such. Promoters may be added to the melt such for example as 2½ weight per cent silicon or titania, or 5 weight per cent of potassium permanganate based on iron. A preferred cataylst may be prepared by decomposing iron carbonyl to form iron powder, adding 1% sodium carbonate or about 5% of alumina to serve as a promoter, then pelleting the powder with the added promoter, sintering the pellets for about four hours at about 1550 to 1650° F. and finally reducing the sintered pellets at about 1550° F. with a reducing gas such as hydrogen. Catalyst particles thus prepared may have a bulk density of about 120 to 150 pounds per cubic foot while the bulk density of iron catalyst precipitated on kieselguhr or other relatively light carrier may have a bulk density as low as about 10 pounds per cubic foot.

The temperature of the synthesis step employing an iron-type catalyst is usually within the range of about 450 and 675° F. for example about 610° F. A pressure of between about 5 and 15 atmospheres may be used.

The cobalt-type catalyst may consist essentially of supported cobalt either with or without one or more promoters such as oxides of magnesium, thorium, manganese, zirconium, titanium, uranium, cerium, aluminum, zinc, etc. The cobalt support is preferably an acid-treated bentonite or montmorillonite clay such as Super Filtrol, but it may be a diatomaceous earth or kieselguhr of low calcium and iron content. A porous structure is of course essential and most clay supports require pretreatment by ignition and acid washing. Other supports such as kaolin, alumina, silica, magnesia, and the like may, of course, be employed but a high quality acid treated clay such as Super Filtrol support is preferred. The catalyst may be prepared by precipitating cobalt and promoter carbonates from nitrate solutions in the presence of the support. In the case of thoria, for example, the promoter may be in amounts of 15 or 20% based on cobalt, higher thoria concentrations being objectionable because of their tendency to promote wax formation. The cobalt-Super Filtrol ratio may be varied from about 5:1 to .1:1 but is usually about 1:1 to .3:1. The precipitated catalyst after filtering, washing, and drying is reduced before use, preferably with hydrogen at a temperature of about 400 to 650° F. A typical catalyst ready for use may contain about 32% cobalt, 1½% thorium oxide, 2½% magnesium oxide and 64% Super Filtrol.

The temperature of the synthesis step employing a cobalt-type catalyst is usually within the range of between about 225 and 450° F., for example, between about 300° F. and 400° F. About atmospheric pressure is used but pressures as high as about 5 atmospheres may be preferred.

Instead of the cobalt or iron catalyst, catalysts of the nickel type or of the ruthenium type may be employed. The above-described catalysts are known to the art, and inasmuch as no invention is claimed in their composition or method of preparation, further description is not believed necessary.

The invention will be more clearly understood from the following detailed description read in conjunction with the accompanying drawing which forms a part of the specification and wherein Figure 1 is a schematic flow diagram of a process design for practicing the invention;

Figure 1:
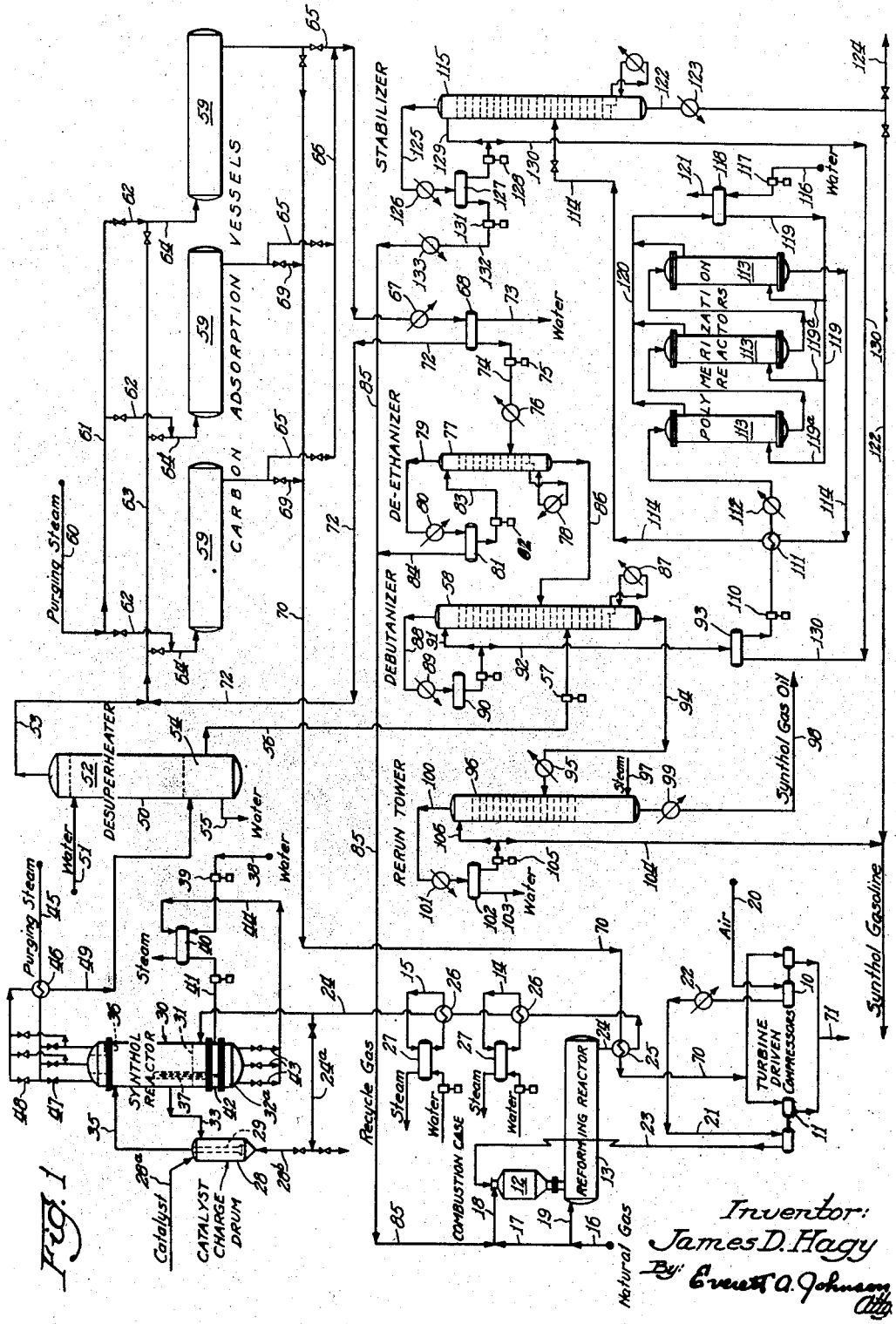

In the specific example a system will be described for handling natural gas which consists essentially of methane. The application of the invention to other charging stock and to plants of various size will be apparent to those skilled in the art from the following description.

The apparatus in the synthesis feed preparation section includes gas turbine-driven centrifugal air compressors 10 and 11, brick-lined combustion case 12 for preheating air and gas; horizontal, catalyst containing reaction vessel 13; and heat exchange equipment which includes steam generators 14 and 15. Although a single reactor is described, it should be understood that a plurality of reactors in parallel can be used.

The charging stock from line 16 is split, about 20 weight per cent being introduced through lines 17 and 18 into combustion case 12 for supplying the heat utilized in the endothermic reaction conducted within the reforming reactor 13. In some instances, it will be necessary to desulfurize the natural gas before it is supplied to the system. Any conventional desulfurization system may be used. About 80 weight per cent of the charging stock is sent by line 19 to the reactor 13 where it is blended with the combustion gases from the combustion case 12. In addition to the charging stock introduced into the combustion case 12, a recycle gas comprising predominately $C_2$, $C_3$, and $C_4$ hydrocarbons, together with a substantial amount of carbon dioxide, is reacted with the air supplied to the combustion case.

Air is supplied by line 20 to the two-stage, centrifugal compressors 10 and 11. The air is withdrawn from the first compressor 10 at a temperature of about 450° F. and 50 pounds pressure. It is cooled by means of cooler 22 to a temperature of about 150° F. and supplied to the second compressor 11. The air is withdrawn from compressor 11 at a temperature of about 430° and at a pressure of about 185 pounds per square inch. This high-pressure air is supplied by line 23 to the combustion case 12 wherein the recycle gases and fresh feed are burned to attain an exit temperature of about 2600° F. and a pressure of about 184 pounds per square inch. Thus the compressed air, natural gas, and a small amount of recycle gas are raised to reaction temperature by combustion of a portion of the total charge with the air within the combustion case. The remainder of the gas is bled by line 19 into the hot gases from the combustion case 12 at the entrance of the reforming reactor 13.

Figure 2:
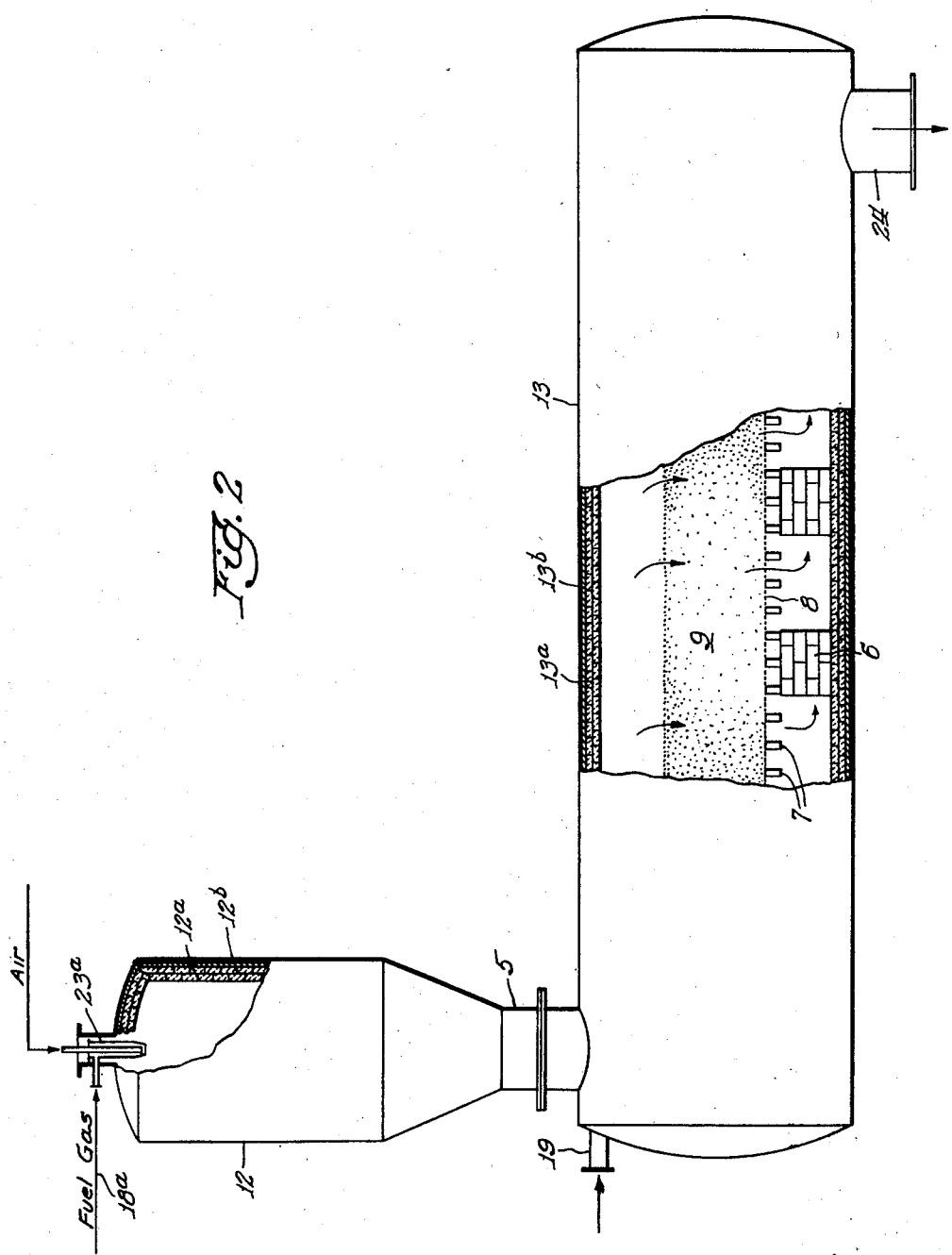
Figure 2 is an enlarged view of the feed gas preparation unit.

Figure 2 illustrates the combustion case-reforming reactor assembly in more or less detail. The combustion case 12 is provided with fire brick lining 12a and internal block insulation 12b between the vessel 12 and the lining 12a. Recycle gas and natural gas are introduced at 18a and compressed air is supplied by line 23a. The bottom of the combustion case is in communication with the upper inlet of the reforming reactor 13. Additional hydrocarbon gas is introduced by 19. The shell of reactor 13 may suitably be about 55 feet long and about 13.5 feet in diameter. The entire vessel 13, including entrance and exit ducts, may be insulated and brick lined. A bed of catalyst 9 is supported on a screen 8 which is in turn held by a grating 7 with brick columns 6 spaced under the grating. The gases pass from above the catalyst bed 9 downwardly and out through line 24. A combustion case of suitable size for use with a reactor of these proportions may be about 9 feet in diameter and about 18 feet in height. The conduit 5 between the combustion case 12 and the reactor 13 may be about 4 feet in diameter. The compressed air inlet 23a may be about 18 inches in diameter, whereas the hydrocarbon gas inlet 18a may be about 3 inches in diameter. At the inlet of the combustion case 12 a conventional burner can be provided, together with a pilot means for initially igniting the gas.

A sufficiently high temperature of above about 2500° F. is maintained in the product gases from the combustion case 12 in order to obtain a temperature of about 1750° F. in the gases leaving the reactor by line 24. Under these conditions of temperature and pressure, the reaction within the reactors 13 is very nearly adiabatic; that is, the oxidation of the methane with the oxygen remaining in the combustion gases will furnish sufficient heat for the reaction of methane with part of the carbon dioxide and water formed in the combustion case 12.

The reactor space velocity based on the "methane equivalent" fed directly to the reactor is approximately 500 v./hr./v. In an actual plant design, two combustion-reforming units are employed, and each reactor contains approximately 2740 cubic feet of catalyst. This catalyst can suitably be disposed in a horizontal bed 9 extending longitudinally through the reactor 13.

As stated above, the catalyst for this conversion step is preferably one or more group VIII metal or metal oxide, preferably nickel or iron or mixtures thereof. The catalyst may be promoted by other metals or metal compounds such as aluminum, magnesium, manganese, calcium, uranium, chromium, molybdenum, vanadium, and the like; and the catalyst may be supported on a suitable support such as clay, kieselguhr, silica gel, alumina, etc. The reaction products in line 24 are passed through heat exchanger 25 wherein the products are cooled from about 1750° F. to about 1150° F. by indirect heat exchange with gases to be employed in the gas turbine drive. The thus-cooled reaction products are passed by line 24 to steam generator unit 14. In unit 14, 450-pound steam is generated, and the reaction products are cooled to about 1,050° F. The reaction products are then passed through steam generation unit 15 which produces 200-pound steam and wherein the reaction products are cooled to about 610° F. and leave the unit at a pressure of about 177 pounds per square inch. The steam generation units 14 and 15 are illustrated as comprising heat exchangers 26 and steam drums 27. Water is introduced into the generator 27, is circulated through exchanger 26, and back to drum 27 where steam is withdrawn.

The synthesis gas stream in line 24 is introduced into the reactor 30 at a low point therein, preferably through a distributor plate 31. A fluidized iron catalyst may be used, and the catalyst is charged to the reactor by means of catalyst charge drum 28. A suitable catalyst recovery means is employed near the top of the reactor 30 and is illustrated as being of the Aloxite type of ceramic filter but cyclones may be used.

A reactor cooling system includes the bayonet-type tube assemblies 37 which extend through the grid 31 and within the dense catalyst phase maintained within the reactor 30. The outside diameter of the larger tube may be about two inches, and the outside diameter of the inner tube about one inch. The total cooling surface required for the production of 4000 to 5000 barrels of liquid product per day may be about 38,000 square feet; whereas a plant of similar capacity, but employing fixed bed catalyst, requires approximately at least 1,400,000 square feet of cooling surface. Cooling water is introduced by line 38 and pump 39 into drum 40 and the preheated water is pumped through line 41 into the manifold 42. Saturated steam, at 200 pounds per square inch gauge, is generated within the tube assemblies and is withdrawn via lines 43 and introduced by line 44 into the drum 40. Control of the rate of heat removal may be accomplished either by variation of the steam pressure or by control of the number of tubes in operation. The cooling tubes 37 may be arranged in separate groups to provide the latter control.

Figure 3:
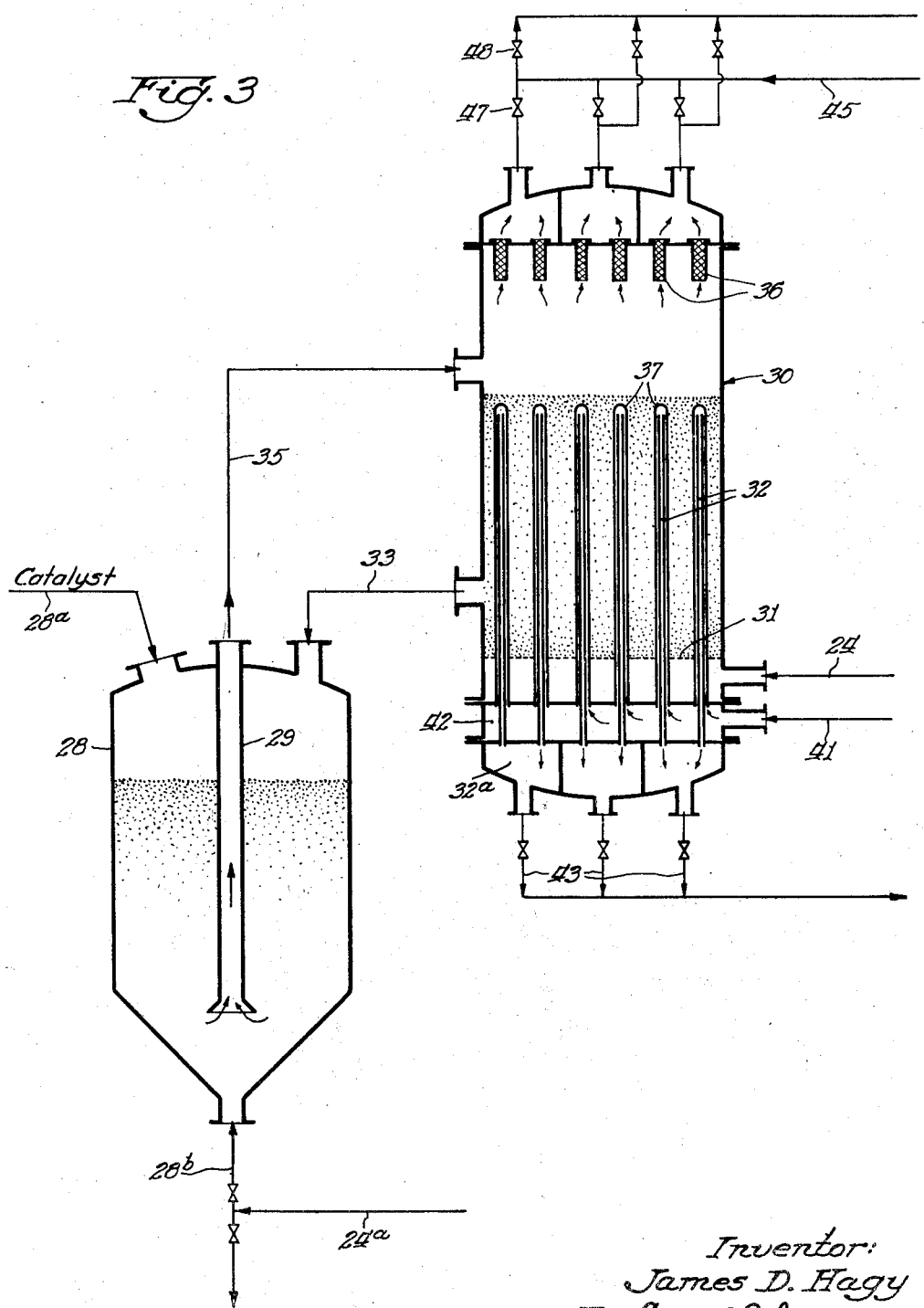
Figure 3 is a vertical section of the catalyst charge drum and synthol reactor.

Figure 3 is a detailed representation of the catalyst charge drum 28 and synthol reactor 30 showing in greater detail the elements. The effective reactor space between the catalyst recovery means 36 and the perforated plate 31 may be about 23 feet, the vessel of this size would be about 12 feet in diameter. Two hundred and forty 4.5 inch outside diameter ceramic filters 36 may be mounted in the upper portion of the reactor. Other catalyst recovery means such as cyclones either external or internal may be used in place of filters 36. The volume above the filters 36 is baffled to provide a plurality of sections communicating with the down stream side of the ceramic filters.

By control of switch valves 47 and 48, selected units of the catalyst filters 36 are blown back with the purging steam to remove the catalyst particles therefrom. Purging steam is introduced by line 45 after having passed through heat exchanger 46, wherein heat is removed from the reaction products.

A plurality of inlets, for example, four, may be used for introducing the feed gas supplied by line 24. The reactor cooling means 37 may comprise about 630 bayonet-type tubes 37. The outside diameter of the larger tube being about 2 inches, and the outside diameter of the inner tube being about 1 inch. The bayonet tube 37 extends through about 15 feet of dense phase catalyst maintained above the perforated plate 31. Water is supplied via line 41 to the manifold section 42 of the cooling mechanism communicating with the outside tube 37 of each bayonet unit. The water flows upwardly to the top of the tube, and returns as steam within the inner tube 32 which communicates with a steam manifold 32a below the water manifold 42, both the water and the steam manifolds being below the point of injection of the feed gas. In some instances it may be preferable to suspend the bayonet tube assemblies from the top of the reactor vessel into the dense turbulent phase.

Referring to the catalyst charge drum 28, catalyst is introduced thereto, for example by hatchway 28a, and accumulated in a lower portion of the drum 28. A gas, for example a portion of the fresh feed from line 24, is introduced at the bottom of the drum via line 24a and 28b. The gas picks up catalyst within the drum, and the suspension is carried upwardly through the internal conduit 29 and out line 35 into the synthol reactor 30. If desired catalyst can be withdrawn from the reactor 30 via line 33 and introduced into the drum 28. This catalyst may be withdrawn downwardly from the system via line 28b or recirculated to the reactor. The catalyst in line 33 can be cooled or treated to maintain or restore activity and recycled.

The substantially catalyst-free reaction products are transferred via line 49 to desuperheater 50. Cooling water is introduced at about 90° F. by line 51 into the desuperheater 50. An intermediate section 52 of desuperheater 50 is packed with suitable contacting material such as Raschig rings. The cooled reaction gases are withdrawn overhead by line 53 at a temperature of about 100° F. and a pressure of 163.5 pounds. In a lower section 54 of the desuperheater, liquid products and water accumulate, water being drawn off as a bottoms layer by line 55 at a temperature of about 120° F., and the hydrocarbons are withdrawn via line 56 and introduced via pump 57 into debutanizer 58.

The product gases having been precooled to about 100° F. by the direct contact tower or desuperheater 50 are introduced to one of carbon adsorption vessels 59. The carbon adsorption vessels 59 are similar to the reforming reactor 13 in that they are horizontally disposed and include a bed of contacting material supported on a screen. Each unit may be about 55 feet long and about 15 feet in diameter. The carbon bed is about 9 feet deep. The vessels 59 operate on a one-hour cycle, twenty minutes on stream, twenty minutes steam purging, and twenty minutes cooling. Purge steam is supplied by line 60, manifold 61, and valved lines 62. The product gases are supplied to the adsorption vessels by line 63, manifold 63, and valved lines 64. By control of the valved lines 62 and 64, it will be apparent that the above cycle can be attained. When on purge, the effluent from the selected carbon adsorption vessel 59 is passed by one of lines 65 and line 66 through cooler 67 and separator 68. When on stream, the effluent from the carbon adsorption vessel 59 is carried by one of lines 69 and line 70 to the turbine-driven compressors 10 and 11. The spent gas is exhausted at 71 at atmospheric pressure at a temperature of about 360° F.

Returning to the hydrocarbon cycle from the carbon adsorption system, the gases are cooled in cooler 67 to about 120° F., and water is separated in separator 68 which is maintained at about 185 pounds per square inch. The uncondensed gases are recycled via line 72 to the carbon adsorption vessels 59. Water is withdrawn via line 73. The hydrocarbon fraction, including substantial amounts of $C_3$, $C_4$, and $C_5$ hydrocarbons, is introduced via line 74, pump 75, and heater 76 into de-ethanizer 77. The de-ethanizer 77 is operated at about 435 pounds per square inch. The charge is supplied at about 200° F., and the reboiler 78 is operated to withdraw bottoms at about 250° F. and to return them at about 290° F. The overhead is withdrawn via line 79, cooled in cooler 80, and condensed material supplied to reflux drum 81. Reflux is supplied by pump 82 and line 83 to the de-ethanizer 77. The gases removed from reflux drum 81 by line 84 consist essentially of $C_2$ and $C_3$ hydrocarbons. These gases are recycled via line 85 to the combustion case 12. The bottoms from de-ethanizer 77 are withdrawn via line 86 and introduced into debutanizer 58. The bottoms from de-ethanizer 77 consist essentially of propylene, a small amount of propane, a substantial amount of butylene-butane, and a predominant portion of pentanes and heavier gasoline hydrocarbons.

Debutanizer 58 may be operated at a pressure of about 185 pounds per square inch, a top temperature of about 155° F., and a bottom temperature of about 385° F. A reboiler 87 can be provided. A fraction comprising essentially propylene, but including smaller amounts of butylene, is taken overhead via line 88, cooled in cooler 89, and introduced into condensate collector 90. A portion of the condensate is returned to debutanizer 58 by line 91 as reflux liquid. A major portion of the condensate, however, is withdrawn by line 92 and introduced into drum 93. The bottoms from debutanizer 58 are pentanes and heavier gasoline hydrocarbons, together with a relatively small proportion of heavier liquids. These bottoms pass via line 94 and steam heater 95 into rerun tower 96. Steam is introduced near the bottom of rerun tower 96 through line 97, whereby a bottom temperature of about 370° F. is maintained with a top temperature of about 300° and a pressure of around 2 pounds. A synthol gas oil is recovered via line 98 and is withdrawn through cooler 99 to storage. It should be understood, however, that this synthol gas oil may be further processed by catalytic conversion, solvent extraction, hydrogenation, and the like. The overhead fraction from rerun tower 96 is taken by line 100, through cooler 101, and into separator-collector 102. Water is withdrawn by line 103, and hydrocarbon condensate comprising essentially pentanes and heavier gasoline hydrocarbons are withdrawn by line 104. A portion of the condensate may be returned by pump 105 and line 106 to the rerun tower 96 as reflux.

The hydrocarbon stream, comprising essentially olefinic $C_3$ and $C_4$ hydrocarbons, is withdrawn from drum 93 and raised to a temperature of about 425° F. and a pressure of 1000 pounds per square inch by means of steam turbine driven pump 110, heat exchanger 111, and heater 112. These hydrocarbons are then subjected to catalytic polymerization within polymerization reactors 113. The reactors 113 are conventional, high-pressure, catalytic polymerization units wherein the reactants and reaction products pass downwardly through the units in series. When using phosphoric acid catalyst, the reaction is effected at between about 400 and 425° F. and a pressure of about 1000 pounds per square inch. The reaction is exothermic and cooling is effected in parallel. Water is supplied via line 116 and pump 117 to steam separator 118. Water is supplied by lines 119 and 119a to the cooling tanks about the tubular reactors. The heated water and steam are removed overhead by lines 120 and introduced into steam separator 118. Steam is withdrawn by line 121. The reaction product withdrawn via line 114 is passed in heat exchange with feed to the polymerization reactors in 111, and the high-pressure gases supplied to the stabilizer 115.

The stabilizer 115 is operated at a pressure of about 175 pounds with a top temperature of 122° F. and a bottom temperature of about 410° F. The stabilized catalytic polymerization product is withdrawn by line 122, cooler 123, and recovered separately in line 124 or blended with the synthol gasoline in line 104. The overhead from stabilizer 115 includes substantial amounts of unreacted olefinic hydrocarbons, is cooled in 126, and introduced into collector 127. A portion of the condensate is returned by pump 128 and line 129 to stabilizer 115 as reflux. Another portion is sent via line 130 to drum 93 for recycle in the polymerization system. The fresh feed is of very high olefin content which permits unusually high per cent of total olefin polymerized based on feed. A portion of the overhead from the polymer gasoline stabilizer 115 is withdrawn via pump 131, line 132, and heater 133 for recycle via line 85 to the combustion case 12. The proportion of overhead selected for recycle to 12 is sufficient to prevent build up of light paraffin hydrocarbons in the polymerization unit.

From the above detailed description it will be seen that the objects of this invention have been accomplished and that a vastly improved system for synthesizing normally liquid hydrocarbons from carbon monoxide and hydrogen has been provided. Although the flow diagram has been described with reference to a single reactor, it is contemplated that a plurality of gas reformers, synthol reactors, and product cooling towers may be used. Ordinarily two gas reformers, six synthol reactors, and two product cooling towers of the types described may be used in a plant producing about 5000 barrels of liquid product per day from about 76,400 MCF/D of natural gas.

While certain preferred embodiments and preferred operating conditions have been described to illustrate the invention, it should be understood that various other modifications and operating conditions will become apparent to those skilled in the art.

What I claim is:

1. The process of producing normally liquid hydrocarbons from methane which includes the steps of dividing a stream of methane into a minor portion and a major portion, oxidizing the minor portion of methane with an excess of air to produce a combustion mixture of carbon dioxide, water, and unreacted air, effecting said combustion at a temperature of above about 2500° F., commingling with the combustion gas the major portion of methane whereby the temperature of the mixture is reduced to about 1750° F., contacting the mixture of combustion gases and methane with a reforming catalyst under substantially adiabatic conditions wherein a portion of the added methane is oxidized exothermically by the residual oxygen and another portion of the added methane is endothermically reacted with carbon dioxide and water resulting from the oxidation of the minor portion of methane, withdrawing the reaction mixture from said catalytic contacting zone, said reaction mixture comprising essentially carbon monoxide, hydrogen, and unreacted air, cooling the synthesis gas to a temperature of about 610° F., supplying the cooled synthesis gas along with the air impurities to a hydrocarbon synthesis zone, contacting the said synthesis gas with a finely divided iron-type catalyst maintained in a dense turbulent fluidized phase, extracting heat from said synthesis zone whereby the temperature is maintained within the range of between about 450 and 675° F., separating reaction products and finely divided catalyst, cooling the separated reaction products by contacting directly with liquid water to recover a gaseous product fraction and a liquid product fraction, recovering hydrocarbon constituents from said gaseous fraction, fractionating the liquid product fraction to recover a predominately propylene fraction, subjecting the propylene fraction to catalytic polymerization to produce additional quantities of gasoline hydrocarbons, recycling a major portion of unreacted propylene to said catalytic polymerization, and bleeding off a minor portion of unreacted low-molecular weight hydrocarbons and recycling said minor portion to said oxidation zone.

2. The process of producing normally liquid hydrocarbons from normally gaseous hydrocarbons which includes the steps of dividing a stream of normally gaseous hydrocarbons into a minor portion and a major portion, oxidizing the minor portion of natural gas with an excess of air to produce a combustion mixture of carbon dioxide, water, and unreacted air, effecting said combustion at a sufficiently high temperature to produce an exit gas temperature of above about 2500° F., commingling with the hot combustion gas the major portion of natural gas whereby the temperature of the mixture is reduced to about 1750° F., contacting the mixture of combustion gases and normally gaseous hydrocarbons with a reforming catalyst for carbon monoxide formation under substantially adiabatic conditions wherein a portion of the hydrocarbons is partially oxidized exothermically by the residual oxygen and another portion of the hydrocarbons is endothermically reacted with carbon dioxide and water resulting from said combustion, withdrawing the gaseous mixture from said catalytic contacting zone, said mixture comprising essentially carbon monoxide, hydrogen, and unreacted air, cooling the mixture to a temperature of about 610° F., supplying the cooled mixture directly to a hydrocarbon synthesis zone, contacting the said mixture with a finely divided iron-type catalyst maintained in a dense turbulent fluidized phase, extracting heat from said synthesis zone whereby the temperature is maintained within the range of between about 450 and 675° F., separating reaction products and finely divided catalyst, desuperheating the separated reaction products by contacting directly with liquid water to produce a gaseous product fraction and a liquid product fraction, recovering hydrocarbon constituents from said gaseous fraction by absorption on activated carbon, fractionating the liquid product fraction to recover a predominately propylene fraction, subjecting the propylene fraction to catalytic polymerization to produce additional quantities of gasoline hydrocarbons, recycling a major portion of unreacted propylene to said catalytic polymerization, bleeding off a minor portion of unreacted $C_3$ hydrocarbons, and recycling said minor portion to said oxidation zone.

JAMES D. HAGY.

REFERENCES CITED

The following references are of record in the file of this patent:

UNITED STATES PATENTS

| Number | Name | Date |
|---|---|---|
| 1,885,060 | Hoffman | Oct. 25, 1932 |
| 1,954,991 | Garner | Apr. 17, 1934 |
| 1,957,743 | Wietzel | May 8, 1934 |
| 1,984,380 | Odell | Dec. 18, 1934 |
| 2,149,515 | Fischer | Mar. 7, 1939 |
| 2,178,824 | Atwell | Nov. 7, 1939 |
| 1,180,376 | Vaughan | Nov. 21, 1939 |
| 2,230,467 | Nelly | Feb. 4, 1941 |
| 2,253,607 | Boyd | Aug. 26, 1941 |
| 2,256,333 | Wilcox | Sept. 16, 1941 |
| 2,270,897 | Roberts | Jan. 27, 1942 |
| 2,290,373 | Lee | July 21, 1942 |
| 2,310,967 | Lassiat | Feb. 16, 1943 |
| 2,324,142 | Parkhurst | July 13, 1943 |
| 2,324,172 | Parkhurst | July 13, 1943 |
| 2,347,682 | Gunness | May 2, 1944 |